(12) United States Patent
Guo et al.

(10) Patent No.: US 11,164,270 B2
(45) Date of Patent: Nov. 2, 2021

(54) ROLE-ORIENTED RISK CHECKING IN CONTRACT REVIEW BASED ON DEEP SEMANTIC ASSOCIATION ANALYSIS

(71) Applicant: INTERNATIONAL BUSINESS MACHINES CORPORATION, Armonk, NY (US)

(72) Inventors: HongLei Guo, Beijing (CN); Zhili Guo, Beijing (CN); Song Xu, Beijing (CN); Shiwan Zhao, Beijing (CN); Elaine M. Branagh, Austin, TX (US); Pitipong Jun Sen Lin, Brookline, MA (US); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/144,732

(22) Filed: Sep. 27, 2018

(65) Prior Publication Data

US 2020/0104957 A1  Apr. 2, 2020

(51) Int. Cl.
*G06Q 10/06* (2012.01)
*G06Q 50/18* (2012.01)
*G06F 40/30* (2020.01)

(52) U.S. Cl.
CPC .......... *G06Q 50/188* (2013.01); *G06F 40/30* (2020.01); *G06Q 10/0635* (2013.01)

(58) Field of Classification Search
USPC ..................................................... 705/7.28
See application file for complete search history.

(56) References Cited

U.S. PATENT DOCUMENTS 9,646,354 B2   5/2017   Kogut-O'Connell et al.
2010/0106533 A1   4/2010   Alvarez
(Continued)

OTHER PUBLICATIONS

Bartczuk Ł., Galushkin A.I. (2016) A New Method for Generating Nonlinear Correction Models of Dynamic Objects Based on Semantic Genetic Programming. In: Rutkowski L., Korytkowski M., Scherer R., Tadeusiewicz R., Zadeh L., Zurada J. (eds) Artificial Intelligence and Soft Computing. May 29, 2016.*

(Continued)

*Primary Examiner* — Matthew D Henry
(74) *Attorney, Agent, or Firm* — Tutunjian & Bitetto, P.C.; Joseph Petrokaitis

(57) ABSTRACT

A method is provided for role-oriented risk analysis in a contract. The method generates, using deep semantic association analysis, a report specifying a set of potential risks relating to explicit and hidden roles of contract parties. The generating step categorizes input statements of the contract into respective obligation/right pairs according to a deep semantic association distribution thereof. Each pair includes a respective obligation and a respective right. The generating step detects deep semantic differences between the respective pairs and a set of reference obligation/right pairs. The generating step identifies the explicit and hidden roles of the involved parties in the respective obligations/rights pairs according to domain-specific use scenarios and multidimensional local and global context clues in the contract. The generating step identifies the set of potential risks by applying a deep semantic role-oriented risk entailment model to the deep semantic differences.

18 Claims, 6 Drawing Sheets

(56) References Cited

U.S. PATENT DOCUMENTS

| | | | | |
|---|---|---|---|---|
| 2015/0058080 A1* | 2/2015 | Kaya | ............... | G06Q 30/0202 |
| | | | | 705/7.31 |
| 2015/0074027 A1* | 3/2015 | Huang | ............... | G06F 40/40 |
| | | | | 706/25 |
| 2015/0310096 A1* | 10/2015 | Bao | ............... | G06F 16/367 |
| | | | | 707/738 |
| 2017/0103466 A1* | 4/2017 | Syed | ............... | G06Q 40/08 |
| 2017/0287090 A1 | 10/2017 | Hunn et al. | | |

OTHER PUBLICATIONS

Jaramillo, Gloria Elena, "A Semantic Contract Model and Knowledge-driven Process for Supporting Controllability in Service-oriented Approaches", University of Pau and Pays de l'Adour (UPPA) Doctoral School of Exact Sciences and their Applications, Doctoral Dissertation, Dec. 2016, 183 pages.

Mitchell, Pierre, "Artificial Intelligence in Contract Management", (Part 4: Natural Language Processing and Machine Learning), Jan. 2017, pp. 1-8.

Humphreys, Llio Byrn,"Populating Legal Ontologies Using Information Extraction Based on Semantic Role Labeling and Text Similarity", University of Luxembourg, The Faculty of Sciences, Technology and Communication, Jul. 25, 2017, 229 pages.

\* cited by examiner

ROLE-ORIENTED RISK CHECKING IN CONTRACT REVIEW BASED ON DEEP SEMANTIC ASSOCIATION ANALYSIS

BACKGROUND

Technical Field

The present invention generally relates to data processing, and more particularly to role-oriented risk checking in contract review based on deep semantic association analysis.

Description of the Related Art

In the contract review, legal professions need to manually check all the clauses of the contract and identify whether there are some risks present in each of the clauses. Actually, the parties involved in the contract play different roles in their respective obligations. In a contract involving Party A and Party B, some obligations might be advantages for Party A while other obligations some might be disadvantages for Party A. For example, given obligations of "The remaining 30% shall pay off to Party A after the equipment is delivered" and "The remaining 30% shall pay off to Party A after the equipment is received", it can be seen that these two obligations have a different impact on Party A and Party B due to their different payment conditions. Hence, it is clear that significantly more effort is required to identify the deep semantic difference and determine the risk for each party involved in the contract.

In contract compliance review, role-oriented deep risk analysis is very important in order to reduce the non-compliance risk. However, existing tools only provide text comparison and detect wording differences among obligations, and cannot determine the deep risks that can be taken on by the involved parties in the contract. Thus, there is a need for a way to perform deep risk checking in contract review.

SUMMARY

According to an aspect of the present invention, a computer-implemented method is provided for role-oriented risk analysis in a contract. The method includes generating, by a processor device using deep semantic association analysis, a report specifying a set of potential risks relating to explicit and hidden roles of involved parties to the contract. The generating step includes categorizing input statements of the contract into respective obligation/right pairs according to a deep semantic association distribution of the input statements. Each of the respective obligation/right pairs includes a respective obligation and a respective right from a set of obligations and a set of rights. The generating step further includes detecting deep semantic differences between the respective obligation/right pairs and a set of reference obligation/right pairs. The generating step also includes identifying the explicit and hidden roles of the involved parties in the respective obligations/rights pairs according to domain-specific use scenarios and multidimensional local and global context clues in the contract. The generating step additionally includes identifying the set of potential risks relating to the explicit and hidden roles of the involved parties by applying a deep semantic role-oriented risk entailment model to the deep semantic differences.

According to another aspect of the present invention, a computer program product is provided for role-oriented risk analysis in a contract. The computer program product includes a non-transitory computer readable storage medium having program instructions embodied therewith. The program instructions are executable by a computer to cause the computer to perform a method. The method includes generating, by a processor device of the computer using deep semantic association analysis, a report specifying a set of potential risks relating to explicit and hidden roles of involved parties to the contract. The generating step includes categorizing input statements of the contract into respective obligation/right pairs according to a deep semantic association distribution of the input statements. Each of the respective obligation/right pairs including a respective obligation and a respective right from a set of obligations and a set of rights. The generating step further includes detecting deep semantic differences between the respective obligation/right pairs and a set of reference obligation/right pairs. The generating step also includes identifying the explicit and hidden roles of the involved parties in the respective obligations/rights pairs according to domain-specific use scenarios and multidimensional local and global context clues in the contract. The generating step additionally includes identifying the set of potential risks relating to the explicit and hidden roles of the involved parties by applying a deep semantic role-oriented risk entailment model to the deep semantic differences.

According to yet another aspect of the present invention, a computer processing system is provided for role-oriented risk analysis in a contract. The computer processing system includes a memory for storing program code. The computer processing system further includes a processor device for running the program code to generate, using deep semantic association analysis, a report specifying a set of potential risks relating to explicit and hidden roles of involved parties to the contract. The processor device runs the program code to generate the report by categorizing input statements of the contract into respective obligation/right pairs according to a deep semantic association distribution of the input statements. Each of the respective obligation/right pairs includes a respective obligation and a respective right from a set of obligations and a set of rights. The processor device runs the program code to generate the report by detecting deep semantic differences between the respective obligation/right pairs and a set of reference obligation/right pairs. The processor device runs the program code to generate the report by identifying the explicit and hidden roles of the involved parties in the respective obligations/rights pairs according to domain-specific use scenarios and multidimensional local and global context clues in the contract. The processor device runs the program code to generate the report by identifying the set of potential risks relating to the explicit and hidden roles of the involved parties by applying a deep semantic role-oriented risk entailment model to the deep semantic differences.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to role-oriented risk checking in contract review based on deep semantic association analysis.

In an embodiment, the use of deep semantic association analysis for the obligations and the involved parties in the contract enables an approach capable of determining the advantages and disadvantages of a given obligation from the view of each involved party in the contract. Advantageously, the present invention can effectively find the potential risk for each involved party, and significantly reduce the efforts of legal professions in contract compliance review as well as effectively reduce the incompliance risk.

In an embodiment, the present invention can be considered to include the following components: (i) obligation extraction and analysis; (ii) obligation difference detection; and (iii) role-oriented risk detection.

By deep semantic comparing and role association analysis, the present invention can capture the deep semantic difference among the obligations and determine the potential risks in the obligations for the involved parties.

It is to be appreciated that the present invention automates a process that is manually performed and is tedious and prone to a manual reviewer missing possible risks, particularly hidden risks relating to hidden roles where such hidden risks and roles are often not readily apparent to a manual reviewer including even a highly experienced manual reviewer. It is to be appreciated that the present invention is capable of detecting any type of risk in a contract, and not simply pecuniary risks. Accordingly, risky physical actions specified in, or otherwise implicated by, a contract can also be detected by the present invention. In this way, the present invention can provide a variety of advantages over manual contract review approaches.

Figure 1:
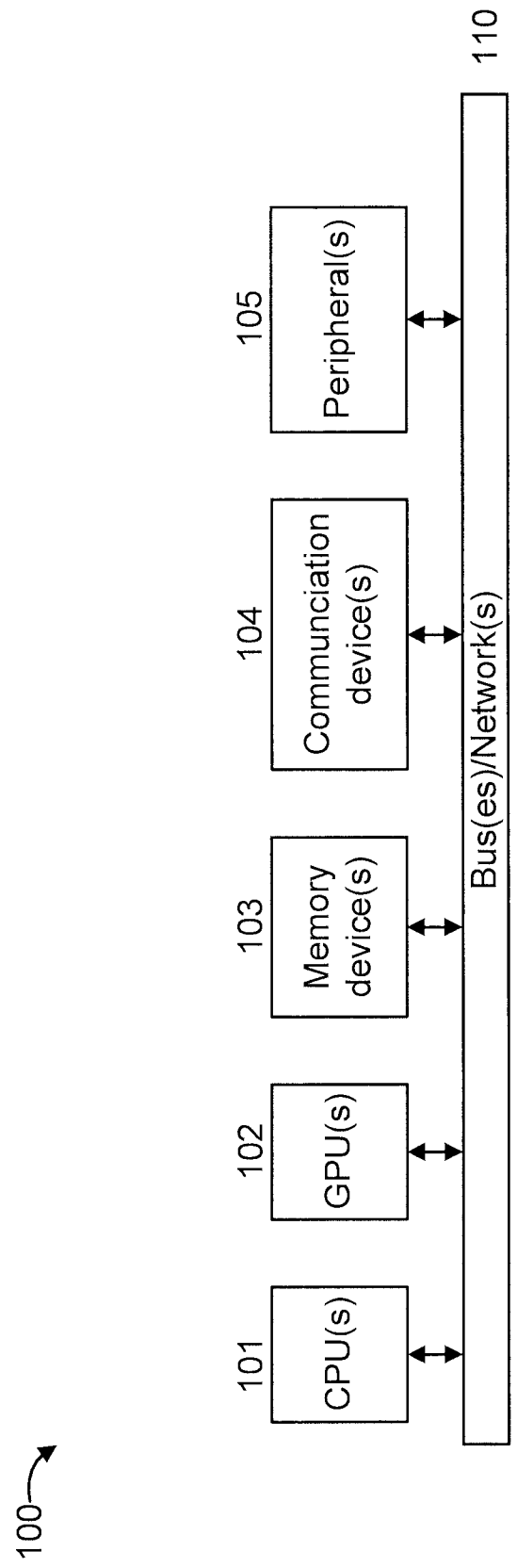
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 5-6). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
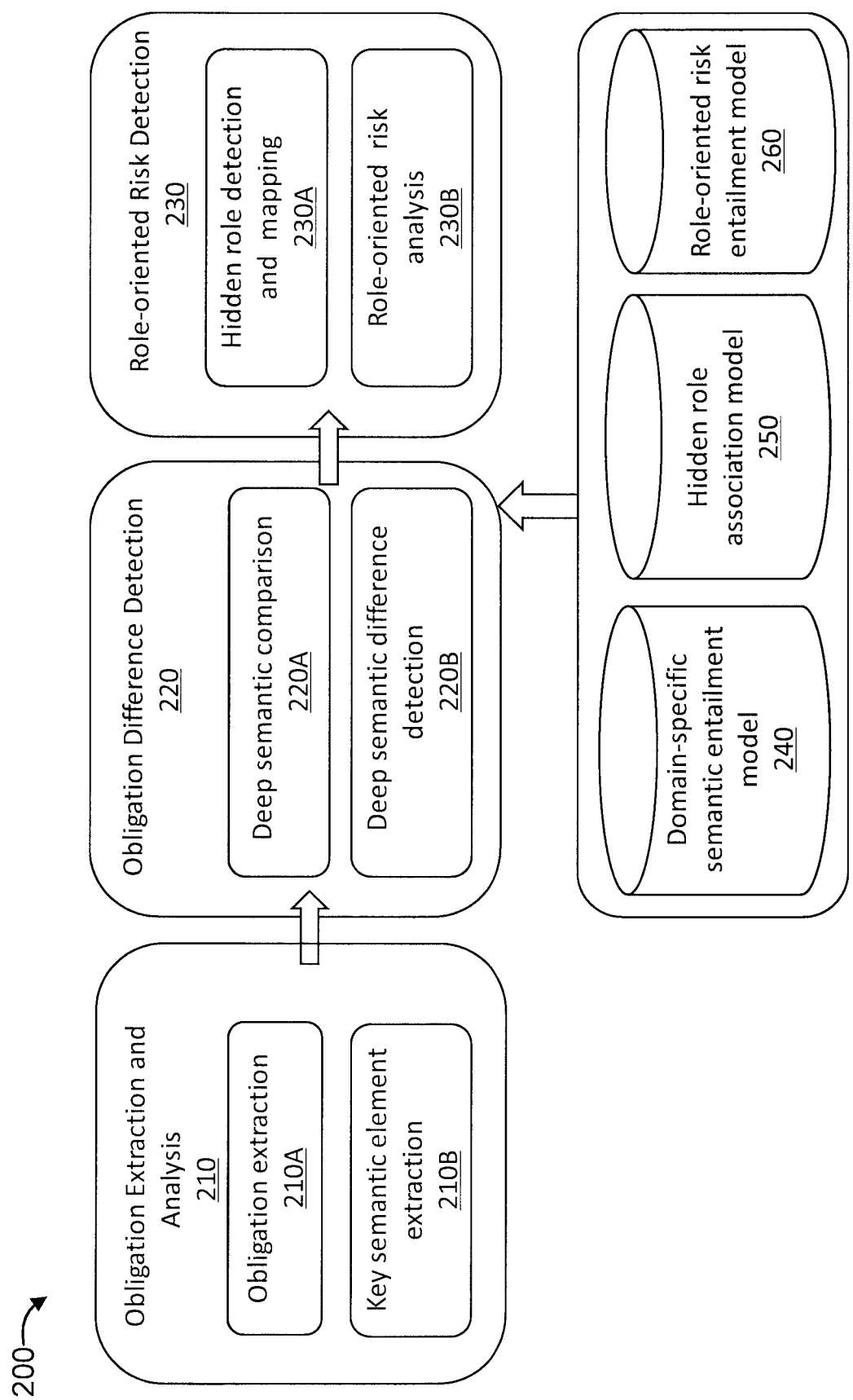
FIG. 2 is a block diagram showing a system architecture to which the present invention can be applied, in accordance with an embodiment of the present invention.

FIG. 2 is a block diagram showing a system architecture 200 to which the present invention can be applied, in accordance with an embodiment of the present invention.

The system architecture 200 includes an obligation extraction and analysis element 210, an obligation difference detection element 220, a role-oriented risk detection element 230, a domain-specific semantic entailment model 240, a hidden role association model 250, and a role-oriented risk entailment model 260.

It is to be appreciated that one or more of the elements of system 100 can be used to implemented one or more of the elements of system architecture 200.

The obligation extraction and analysis element 210 includes an obligation extraction element 210A and a key semantic element extraction element 210B.

The obligation difference detection element 220 includes a deep semantic comparison element 220A and a deep semantic difference detection element 220B.

The role-oriented risk detection element 230 includes a hidden role detection and mapping element 230A and a role-oriented risk analysis element 230B.

Further regarding the obligation extraction and analysis element 210, the same extracts obligations from the contracts and extracts the key semantic elements to characterize the obligation. Each obligation is characterized by these key semantic elements. Thus, as an example, an obligation can be characterized as follows:

Obligation:={action, action-agent, constraints: {temporal, spatial and context}}.

Further regarding the deep semantic comparison element 220A of the obligation difference detection element 220, the same compares the current obligation against the compliance samples over the key semantic elements and finds the matched reference obligation sample.

Further regarding the deep semantic difference detection element 220B of the obligation difference detection element 220, the same finds the semantic differences against the standard and compliance reference samples.

Further regarding the hidden role detection and mapping element 230A of the role-oriented risk detection element 230, the same extracts both explicit and hidden roles involved in the obligation according to the domain-specific semantic scenarios and multidimensional context clues.

Then the mapping between the roles and the involved parties is created by global semantic association analysis in the contract.

Further regarding the role-oriented risk analysis element 230B of the role-oriented risk detection element 230, the same performs risk detection for each role with the deep semantic entailment on the detected differences.

The domain-specific semantic entailment model 240 stores the learning parameters and the binary semantic entailment model generated by the deep learning method. The domain-specific semantic entailment model 240 is applied to detect the semantic entailment of the given two texts.

The hidden role association model 250 stores the learning parameters and the learned role association model. The hidden role association model 250 will be applied to detect the hidden role mentioned in the given text.

The role-oriented risk entailment model 260 stores the learning parameters and the role-oriented risk rules. The -oriented risk entailment model 260 will be applied to detect the role-oriented risk in the given text.

Figure 3:
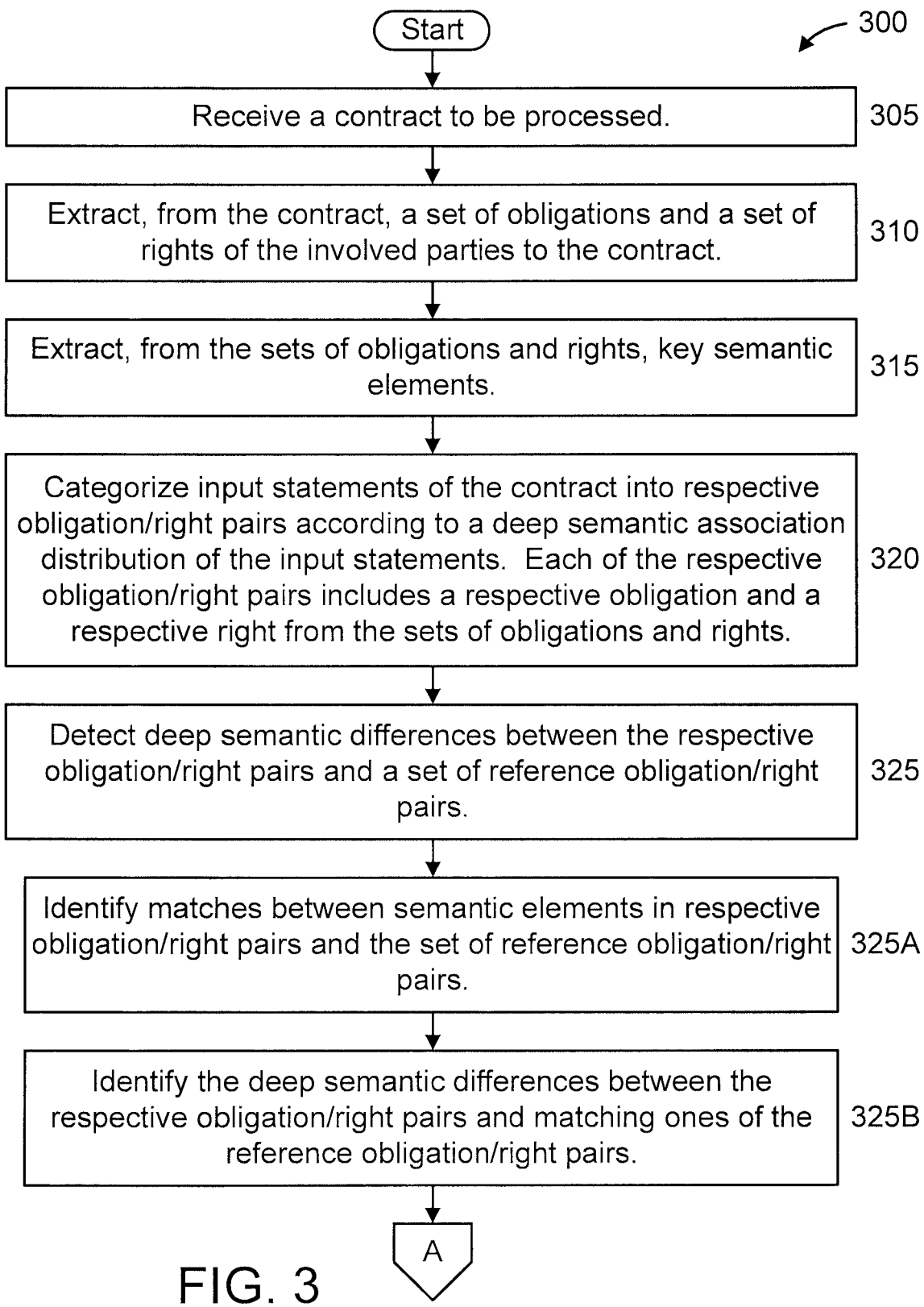
FIGS. 3-4 are flow charts showing an exemplary method for role-oriented risk checking in contract review based on deep semantic association analysis, in accordance with an embodiment of the present invention.
Figure 4:
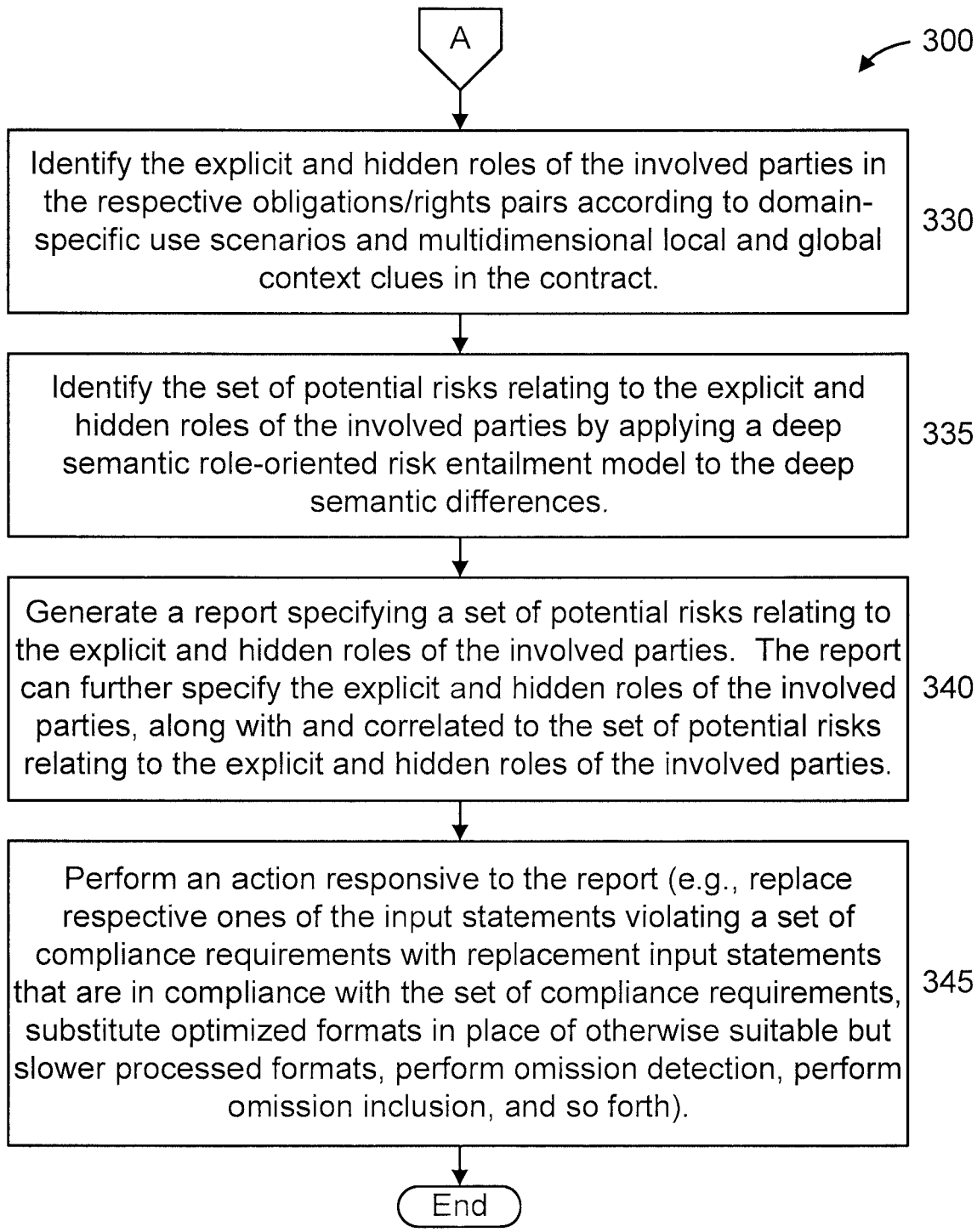

FIGS. 3-4 are flow charts showing an exemplary method 300 for role-oriented risk checking in contract review based on deep semantic association analysis, in accordance with an embodiment of the present invention.

At block 305, receive a contract to be processed.

At block 310, extract, from the contract, a set of obligations and a set of rights of the involved parties to the contract. The extraction can be performed, e.g., using a machine learning approach in order to gain knowledge of new obligations and rights over time, and so forth. The extraction can be performed based on a word comparison to a database of reference obligations and rights. These and other extraction approaches can be used.

At block 315, extract, from the sets of obligations and rights, key semantic elements. It is to be appreciated that the semantic elements that are "key" will vary based on the implementation. In an embodiment, a selection can be made between various semantic dictionaries, each including respective key semantic elements for a given target domain. In this way, different contract features can be evaluated from one contract to another, depending upon what is considered "key" by the involved parties or in general based on, for example, the various semantic dictionaries. In an embodiment, a machine learning approach can be used to extract the key semantic elements.

At block 320, categorize input statements of the contract into respective obligation/right pairs according to a deep semantic association distribution of the input statements. Each of the respective obligation/right pairs includes a respective obligation and a respective right from the sets of obligations and rights. In an embodiment, the deep semantic association distribution is performed using at least the key semantic elements (extracted per block 315). As used herein, the term "deep semantic association distribution" refers to the underlying semantic characteristic distribution of the given inputs. In an embodiment, block 320 can include associating the obligations with an action, an agent (or party) performing the action, and temporal, spatial, and context constraints (on the obligations).

At block 325, detect deep semantic differences between the respective obligation/right pairs and a set of reference obligation/right pairs. As used herein, the term "deep semantic differences" refers to the semantic differences beyond the surfacing wording.

In an embodiment, block 325 includes blocks 325A and 325B.

At block 325A, identify matches between semantic elements in respective obligation/right pairs and the set of reference obligation/right pairs.

At block 325B, identify the deep semantic differences between the respective obligation/right pairs and matching ones of the reference obligation/right pairs.

At block 330, identify the explicit and hidden roles of the involved parties in the respective obligations/rights pairs according to domain-specific use scenarios and multidimensional local and global context clues in the contract. The domain-specific use scenarios can be stored in a domain-specific semantic entailment model (e.g., model 240 of FIG. 2). Examples of multidimensional local context clues include, but are not limited to, word, phrases, domain terms, surrounding context in the given obligations/rights. Examples of multidimensional global context clues include, but are not limited to, the domain, the task, the involved parties in the contract. In particular, hidden roles can be uncovered by the context clues surrounding the current text and the related content in the other sections.

At block 335, identify the set of potential risks relating to the explicit and hidden roles of the involved parties by applying a deep semantic role-oriented risk entailment model (e.g., model 260 of FIG. 2) to the deep semantic differences.

At block 340, generate a report specifying a set of potential risks relating to the explicit and hidden roles of the involved parties. In an embodiment, the report can further specify the explicit and hidden roles of the involved parties, along with and correlated to the set of potential risks relating to the explicit and hidden roles of the involved parties. In an embodiment, the hidden roles of the involved parties and potential risks relating to the hidden roles can be emphasized in the report to enhance a visibility of the hidden roles and the potential risks relating to the hidden roles. In this way, the involved parties or a reviewer can readily see and not miss the hidden roles and the potential risks relating thereto.

At block 345, perform an action responsive to the report. As is readily appreciated by one of ordinary skill in the art, the action that is performed is dependent upon the implementation. In an embodiment, block 345 can involve replacing respective ones of the input statements violating a set of compliance requirements with replacement input statements that are in compliance with the set of compliance requirements. That is, block 345 can involve replacing any of the obligation/right pairs with replacement obligation/right pairs that implicate a revised set of potential risks that is in compliance with a set of compliance requirements, responsive to the set of potential risks relating to the explicit and hidden roles of the involved parties violating the set of compliance requirements. This can prevent a contract initially having an incompatible statement or clause structure or obligation/right pairs with exceedingly high potential risks from being used until the document is modified to be made compliant with a particular set of requirements. The set of requirements can involve processing resources (e.g., an expected amount of processing resources, etc.), format, processing time (e.g., an expected processing time, etc.), potential risk(s) below a particular threshold(s), and so forth. Moreover, optimized formats can be substituted in place of otherwise suitable but slower processed formats, where the optimized formats are designed for quick processing so as to minimize computational and processing resources implicated in processing contracts having such optimized formats. The optimized format designed for quick processing can involve special characters or statement structures that are designed to be more readily (i.e., quicker) recognized and/or more readily (quicker) parsed and/or so forth. As another example, omission detection can be performed at the statement level in order to detect omissions of expected and likely important statements in contacts. In such a case, the action can be the detection of an omission and the inclusion of the omitted material as a new statement in the new contract. In this way, completeness of contracts can be enhanced if not assured. It is to be appreciated that in the preceding description of block 345, the term "statement" can be replaced by "obligation" and/or "right" since the statements in the contract specify the obligations and rights of the respective parties to the contract. These and other actions are readily determined by one of ordinary skill in the art, given the teachings of the present invention provided herein, while maintaining the spirit of the present invention.

In an embodiment, method 300 can be provided as a cloud service in order to provide cloud-based contract compliance checking. The service could further offer actions that can be performed depending upon the results of checking a given contract. These and other implementations of method 300, including cloud and non-cloud-based implementations, are readily determined by one of ordinary skill in the art, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
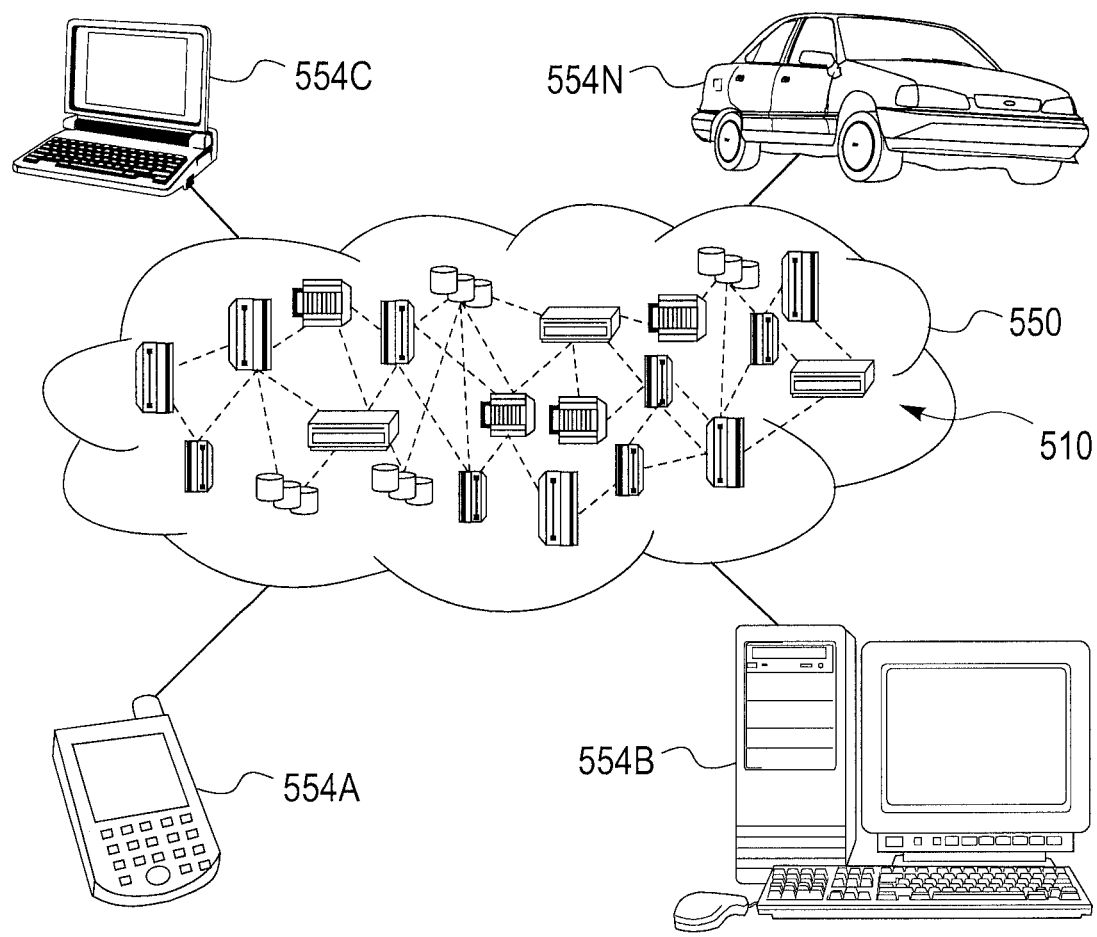
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
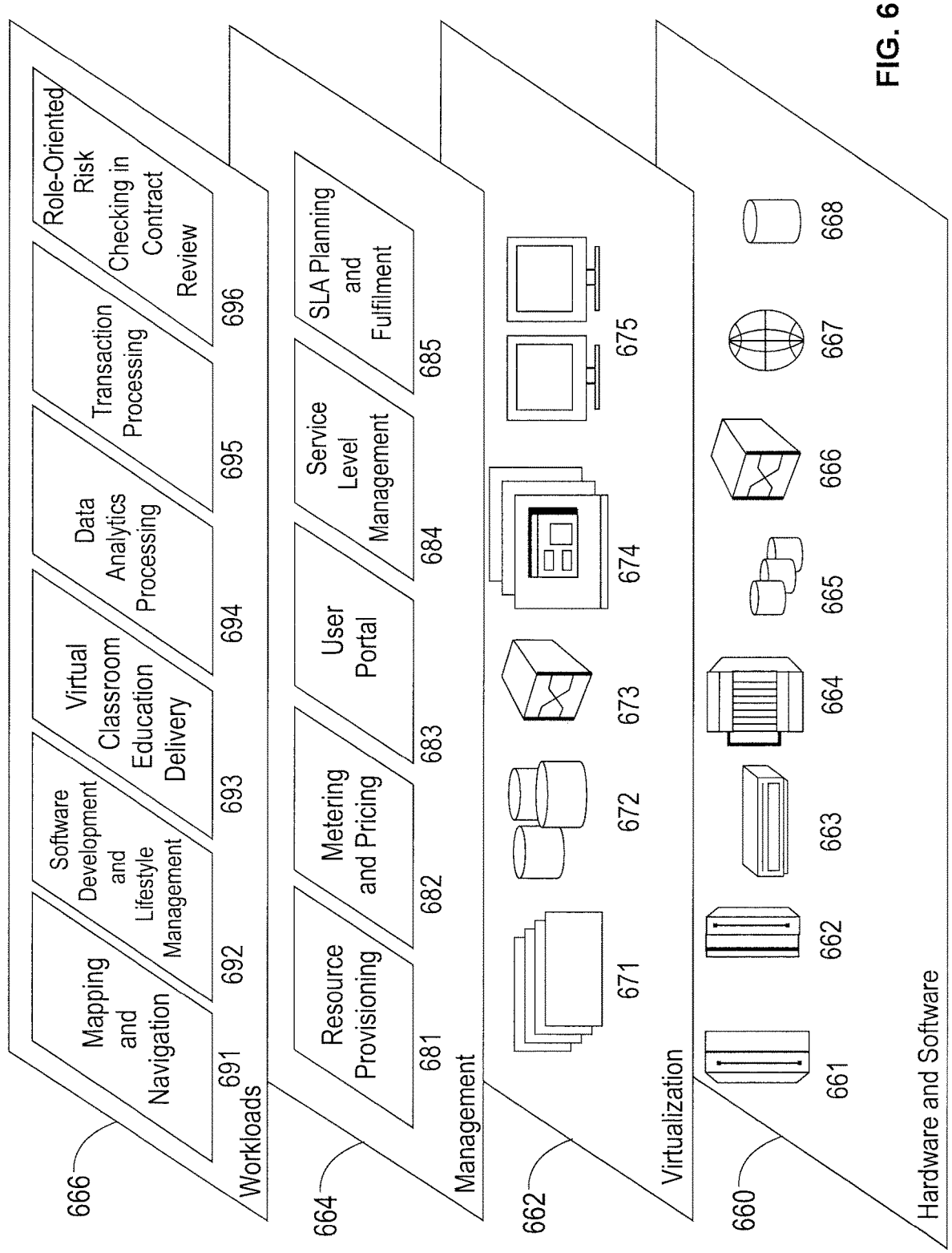
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and role-oriented risk checking in contract review based on deep semantic association analysis 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for automatic statement compliance replacement in a contract, comprising:
   generating, by a processor device using deep semantic association analysis by a neural network, a report specifying a set of potential risks relating to explicit and hidden roles of involved parties to the contract by categorizing input statements of the contract into respective obligation/right pairs according to a deep semantic association distribution of the input statements, each of the respective obligation/right pairs including a respective obligation and a respective right from a set of obligations and a set of rights, wherein the deep semantic association distribution associates the obligations with an action, an agent performing the action, and temporal, spatial, and context constraints on the obligations;
   detecting deep semantic differences beyond superficial wording between the respective obligation/right pairs and a set of reference obligation/right pairs;
   identifying the explicit and hidden roles of the involved parties in the respective obligations/rights pairs according to domain-specific use scenarios and multidimensional local and global context clues in the contract;
   identifying the set of potential risks relating to the explicit and hidden roles of the involved parties by applying a deep semantic role-oriented risk entailment model that stores role-oriented rules to the deep semantic differences; and
   automatically replacing, by a machine, respective ones of the input statements violating a set of compliance requirements with compliant input statements in compliance with the set of compliance requirements, responsive to the set of potential risks relating to the explicit and hidden roles of the involved parties violating the set of compliance requirements.

2. The computer-implemented method of claim 1, wherein the report further specifies the explicit and hidden roles of the involved parties.

3. The computer-implemented method of claim 1, wherein (i) the hidden roles of the involved parties and (ii) the potential risks relating to the hidden roles, are emphasized in the report to enhance a visibility of the hidden roles and the potential risks relating to the hidden roles.

4. The computer-implemented method of claim 1, wherein said categorizing step comprises characterizing each of the obligations by key semantic elements extracted from the set of obligations.

5. The computer-implemented method of claim 1, wherein said categorizing step comprises associating the obligations with an action, an agent performing the action, and temporal, spatial, and context constraints.

6. The computer-implemented method of claim 1, wherein said detecting step comprises:
   identifying matches between semantic elements in respective obligation/right pairs and the set of reference obligation/right pairs; and
   identifying the deep semantic differences between the respective obligation/right pairs and matching ones of the reference obligation/right pairs.

7. The computer-implemented method of claim 1, further comprising determining whether the respective obligation/right pairs are compliant with a set of compatibility requirements, and modifying the respective obligation/right pairs to be compliant responsive to a determination of non-compliance.

8. The computer-implemented method of claim 1, further comprising replacing any of the obligation/right pairs with replacement obligation/right pairs that implicate a revised set of potential risks that is in compliance with a set of compliance requirements, responsive to the set of potential risks relating to the explicit and hidden roles of the involved parties violating the set of compliance requirements.

9. The computer-implemented method of claim 1, wherein the set of compliance requirements comprises an expected amount of processing resources, a format, and an expected processing time.

10. A computer program product for automatic statement compliance replacement in a contract, the computer program product comprising a non-transitory computer readable storage medium having program instructions embodied therewith, the program instructions executable by a computer to cause the computer to perform a method comprising:
   generating, by a processor device of the computer using deep semantic association analysis, a report specifying a set of potential risks relating to explicit and hidden roles of involved parties to the contract by
      categorizing input statements of the contract into respective obligation/right pairs according to a deep semantic association distribution of the input statements, each of the respective obligation/right pairs including a respective obligation and a respective right from a set of obligations and a set of rights, wherein the deep semantic association distribution associates the obligations with an action, an agent performing the action, and temporal, spatial, and context constraints on the obligations;
      detecting deep semantic differences beyond superficial wording between the respective obligation/right pairs and a set of reference obligation/right pairs;
      identifying the explicit and hidden roles of the involved parties in the respective obligations/rights pairs according to domain-specific use scenarios and multidimensional local and global context clues in the contract;
      identifying the set of potential risks relating to the explicit and hidden roles of the involved parties by applying a deep semantic role-oriented risk entailment model that stores role-oriented rules to the deep semantic differences; and
   automatically replacing, by a machine, respective ones of the input statements violating a set of compliance requirements with compliant input statements in compliance with the set of compliance requirements, responsive to the set of potential risks relating to the explicit and hidden roles of the involved parties violating the set of compliance requirements.

11. The computer program product of claim 10, wherein the report further specifies the explicit and hidden roles of the involved parties.

12. The computer program product of claim 10, wherein (i) the hidden roles of the involved parties and (ii) the potential risks relating to the hidden roles, are emphasized in the report to enhance a visibility of the hidden roles and the potential risks relating to the hidden roles.

13. The computer program product of claim 10, wherein said categorizing step comprises characterizing each of the obligations by key semantic elements extracted from the set of obligations.

14. The computer program product of claim 10, wherein said categorizing step comprises associating the obligations with an action, an agent performing the action, and temporal, spatial, and context constraints.

15. The computer program product of claim 10, wherein said detecting step comprises:
   identifying matches between semantic elements in respective obligation/right pairs and the set of reference obligation/right pairs; and
   identifying the deep semantic differences between the respective obligation/right pairs and matching ones of the reference obligation/right pairs.

16. The computer program product of claim 10, wherein the method further comprises determining whether the respective obligation/right pairs are compliant with a set of compatibility requirements, and modifying the respective obligation/right pairs to be compliant responsive to a determination of non-compliance.

17. The computer program product of claim 10, wherein the method further comprises replacing any of the obligation/right pairs with replacement obligation/right pairs that implicate a revised set of potential risks that is in compliance with a set of compliance requirements, responsive to the set of potential risks relating to the explicit and hidden roles of the involved parties violating the set of compliance requirements.

18. A computer processing system for automatic statement compliance replacement in a contract, comprising:
   a memory for storing program code; and
   a processor device for running the program code to generate, using deep semantic association analysis, a report specifying a set of potential risks relating to explicit and hidden roles of involved parties to the contract by
      categorizing input statements of the contract into respective obligation/right pairs according to a deep semantic association distribution of the input statements, each of the respective obligation/right pairs including a respective obligation and a respective right from a set of obligations and a set of rights, wherein the deep semantic association distribution associates the obligations with an action, an agent performing the action, and temporal, spatial, and context constraints on the obligations;

detecting deep semantic differences beyond superficial wording between the respective obligation/right pairs and a set of reference obligation/right pairs;

identifying the explicit and hidden roles of the involved parties in the respective obligations/rights pairs according to domain-specific use scenarios and multidimensional local and global context clues in the contract;

identifying the set of potential risks relating to the explicit and hidden roles of the involved parties by applying a deep semantic role-oriented risk entailment model that stores role-oriented rules to the deep semantic differences; and automatically replacing respective ones of the input statements violating a set of compliance requirements with compliant input statements in compliance with the set of compliance requirements, responsive to the set of potential risks relating to the explicit and hidden roles of the involved parties violating the set of compliance requirements.

* * * * *